March 26, 1935.  J. B. KIRBY  1,995,925
LAUNDRY MACHINE
Filed June 13, 1930
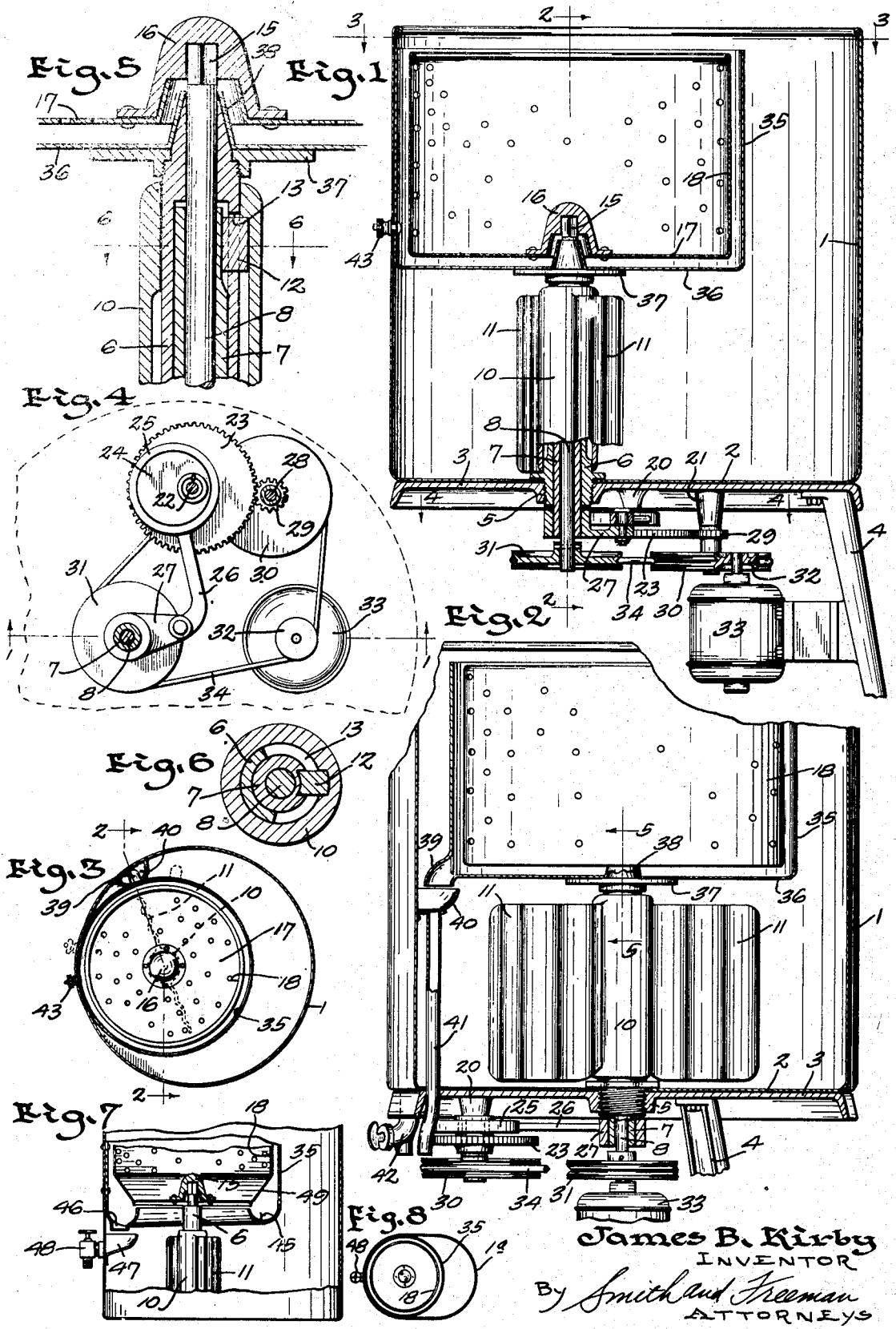
James B. Kirby
INVENTOR
By Smith and Freeman
ATTORNEYS Patented Mar. 26, 1935

1,995,925

UNITED STATES PATENT OFFICE 1,995,925

LAUNDRY MACHINE

James B. Kirby, West Richfield, Ohio, assignor, by mesne assignments, to The Apex Electrical Manufacturing Company, Cleveland, Ohio, a corporation of Ohio, as trustee Application June 13, 1930, Serial No. 460,911

11 Claims. (Cl. 68—15)

This invention relates to laundry machines and has for its object the provision of an improved and simplified clothes washer and extractor, employing a peculiarly small amount of mechanism; the provision of a combined clothes washer and extractor having a new and improved arrangement of parts whereby the mechanism can be made of reduced size without destroying its utility; the provision of new, improved and simplified drainage expedients; while further objects and advantages of the invention will become apparent as the description proceeds.

In the drawing accompanying and forming a part of this application I have shown certain illustrative forms of my invention. Fig. 1 is a vertical sectional view through a preferred form of my improved laundry machine; Fig. 2 is a vertical sectional view corresponding to the lines 2—2 of Figs. 1 and 3; Fig. 3 is a top plan view of the machine shown in Figs. 1 and 2 drawn to reduced scale; Fig. 4 is a horizontal sectional view corresponding to the lines 4—4 of Fig. 1; Fig. 5 is a detail sectional view corresponding to the line 5—5 of Fig. 2; Fig. 6 is a horizontal sectional detail view corresponding to the line 6—6 of Fig. 5; Fig. 7 is a view of a modified form of machine partly broken away; and Fig. 8 is a top plan view of the machine shown in Fig. 7.

My improved laundry machine comprises an upright liquid-containing casing 1, preferably having cylindrical sheet-metal sides and a flat bottom 2, the latter resting on a flat rigid plate 3 supported by suitable legs 4. The plate 3 is formed with a vertically threaded boss 5 displaced from its center, and tightly receiving the lower end of a vertical hollow bearing sleeve 6 in which is rotatably journaled the hollow shaft 7, which in turn contains the central shaft 8.

Rotatably surrounding the exterior of the sleeve 6 is the hollow hub 10 of the dasher, whose exterior is provided with suitable blades 11—11. In the form of the invention here shown these blades consist of vertical wings, more or less corrugated and projecting from opposite sides of the hub, while the hub itself is secured to the hollow shaft 7 in driving relation by means of a suitable key 12, the side wall of the sleeve 6 being suitably slotted as shown at 13 to permit an oscillatory movement of the dasher and its operating shaft through a considerable angle, which however, is less than 180°. The upper end of the shaft 8 is made prismatic as shown at 15, or otherwise suitably formed to support and rotate an extractor container, which generally consists of a hub 16 suitably socketed for the reception of this shaft and having a bottom wall 17 and side wall 18 suitably connected thereto. The diameter of the container 18 is made less than that of the casing 1, and the shaft 8 is so located in that casing as to bring the side wall of the container near the side wall of the casing at one point, thereby leaving a working opening adjacent the other side wall of the casing as shown in Fig. 3.

In order to operate the washing and extracting elements I have shown a particularly simple mechanism, although it will be understood that many modifications or additions could be made thereto. Depending from the plate 3 are two rigid bosses 20, 21. Secured to the boss 20 is a stud 22 on which is journaled a spur gear 23 which carries the eccentric 24 surrounded by the band 25 having an arm 26 articulated to the lever 27 connected to the hollow shaft 7. Carried by the boss 21 is a stud 28 on which is journaled a pinion 29 which meshes with the gear 23 and has its hub secured to the belt wheel 30 which is located in the same plane with a second belt wheel 31 fastened to the shaft 8, and with a pulley 32 carried by the armature shaft of a vertically mounted electric-motor 33. These two belt wheels and the pulley are embraced by a single belt 34, whereby the mechanism is operated continuously so long as the motor is running. In the form of the invention here shown the blades 11 of the dasher project in opposite directions from the hub and are oscillated to each side of a mean position which is perpendicular to the line that joins the centers of the casing and extractor.

To control the disposition of the extracted liquid, and to protect the operator from injury by the rotating container, I provide a shield or guard ring having an upright imperforate side wall 35 concentric with the extractor, and preferably removably secured to the side wall of the casing 1. In the form of the invention shown in Figs. 1, 2, and 3 this guard ring is also formed with an imperforate bottom 36 supported by the upper end of the sleeve 6, as by means of a flat plate 37 detachably mounted thereon. I have shown the center of the bottom 36 as elevated into the hollow hub 16 at 38 to guard against leakage of liquid at this point. The side of this shield or guard ring is formed at one point with a discharge spout 39, and the side wall of the casing 1 is provided with a catch basin 40 adapted to receive the effluent from said spout and to discharge it by way of the pipe 41, independently of the main casing which is provided with a waste valve 42, preferably adjacent thereto. In case the guard ring be made in the form of a complete shield, the same may be supported so as to be adjustable angularly about its support as shown in Figs. 1, 2 and 3 in which case it is possible either to discharge its contents into the pipe 41 or back into the casing 1, depending upon the position of the spout as shown in full and dotted lines in Fig. 3. I have shown a clamping bolt 43 carried by the shield 35 and projecting through a horizontal slot in the wall of the casing 1 to enable the position of this shield to be controlled. Upon removal of the bolt 43 and the container 18 the guard ring 35 may be readily removed from the machine.

In the form of the invention shown in Figs. 1, 2 and 5 the bottom plate 17 of the extractor is perforated, and the bottom 36 of the shield is made imperforate. In the modified form shown in Fig. 7, the bottom of the guard ring is left open, and in this case the guard ring is preferably mounted permanently in the casing. The interior of this guard ring is formed at its lower end with an annular gutter 45 formed with a discharge orifice 46 at the point nearest the casing wall, under which is located a catch-basin 47 communicating with an external waste valve 48. The extractor in this case is formed imperforate below a certain level, the imperforate portion of the side walls being made slanting as shown at 49 so that the liquid will be discharged therefrom under the influence of centrifugal force. When the valve 48 is open all the effluent will be discharged outside the casing, but when that valve is closed all the effluent will be returned to the casing 1 excepting the comparatively small portion required to fill the basin 47. In both constructions the removal of the container (followed in the first case by that of the shield also) enables ready access to the casing interior for wiping or repair. The casing in Figs. 7 and 8 is made of oval shape to save space while still providing the desired working opening. Both this shape and the circular forms of Figs. 1 and 3 are comprised within the term "rounded" as used in my claims.

With this machine all washing and extracting functions are performed simultaneously. It is perfectly possible to introduce articles of clothing into the washing compartment without stopping the mechanism, and likewise to withdraw the same from the washing compartment although it is equally easy to stop and start the motor. Due to the eccentric location of the agitator in the washing compartment it is feasible to make this compartment quite small without impairing its ability to handle articles of considerable size, thus making a practicable machine for apartment house dwellers and others who have neither room nor need for a large machine, yet who desire at different times to wash all manner of articles.

It is within my invention to use a valve such as 48 in the downspout 41 of Fig. 2 and thus dispense with the necessity of turning the shield 35, to control the disposition of the extracted liquid, although when this feature is employed with a guard ring of the particular style here shown it is still desirable that the guard ring be removably mounted to enable wiping, inspection, and repair. These features are not, however, limited to use with eccentrically mounted extractors, and it will be understood that many changes in mechanism, and in details and in design can be made, that clutches and other mechanical appliances can be employed to enable the independent operation of different parts, and that other variations can be made from the details here shown without departure from my inventive ideas, so that I do not limit myself except as specifically recited in my several claims which I desire may be construed each independently of limitations contained in other claims.

Having thus described my invention what I claim is:

1. In a combined clothes washing and extracting machine, a liquid containing casing which is rounded in horizontal section, means for determining a maximum liquid level therein, clothes washing devices in the lower part of said casing, an extractor container located in the upper part of said casing between the liquid level and the top of the casing and eccentrically of said casing, said container being circular in horizontal section and mounted on a vertical shaft and of smaller diameter than said casing and being located close to one side thereof, and a guard ring embracing said container in closely spaced relation and defining with the further side of said casing a working opening communicating with the lower part thereof.

2. In a clothes washing machine, a liquid containing casing which is substantially rounded in horizontal section, a clothes washing element eccentrically mounted therein on a vertical axis, said washing-element comprising a bladed dasher, means including a hollow vertical shaft for oscillating said dasher about its axis, a container coaxial with said dasher and located above the same, and means including a shaft journaled in said hollow vertical shaft for rotating said container independently of the motion of said dasher, said container being close to the casing wall at one side and spaced substantially away therefrom at the other side.

3. In a clothes washing machine, a liquid containing casing which is substantially rounded in horizontal section, and a clothes washing element therein, said element comprising an upright hub journaled for oscillatory movement about a vertical axis which is displaced laterally from the axis of the casing, said element also comprising water-displacing blades, a centrifugal container located in the upper part of said casing and being close to the casing wall at one side, the other side being spaced from said casing wall to define a working opening, means for oscillating said blades and for rotating said container, and a stationary guard element embracing that side of the container which is spaced from the casing wall.

4. In a combined clothes washing and extracting machine, a liquid containing casing which is rounded in horizontal section, an extractor container located in the upper part of said casing and circular in horizontal section and smaller than said casing and located with its wall close to the casing wall at one side and spaced from the casing wall at the opposite side an oscillatable dasher mounted in the bottom part of said casing, means for oscillating said dasher and means for rotating said container, said oscillating means and said rotating means comprising coaxial shafts one within the other for selectively driving said extractor container and said dasher.

5. In a combined clothes washing and extracting machine, a liquid containing casing which is rounded in horizontal section, clothes washing devices in the lower part of said casing, an extractor container located in the upper part of said casing and eccentrically thereof, said container being circular in horizontal section and mounted on a vertical shaft and of smaller diameter than said casing and located close to one side thereof, a guard-ring embracing said container at a little distance, and defining with the further side of said casing a working opening communicating with the lower part thereof, means for operating said washing devices and rotating said container means cooperating with the guard-ring to catch extracted liquid, a catch basin carried by the side wall of the casing, near the guard-ring, means for draining said catch basin outside the casing, and means for delivering to said catch basin the extracted liquid caught by said guard-ring.

6. In a combined clothes washing and extracting machine, a casing, an extractor located therein and spaced above the bottom thereof, a liquid agitating element located in the bottom portion of said casing a removable liquid-arresting member surrounding said extractor inside said casing and adapted to receive the extracted liquid, said member having a discharge orifice, a catch basin carried by said casing adapted to receive the effluent from said orifice, and means for shifting said member and its discharge orifice for discharging said effluent either into said catch basin or into said casing selectively.

7. In a combined clothes washing and extracting machine, a casing, an extractor located therein and spaced above the bottom thereof, a liquid agitating element located in the bottom portion of said casing a liquid-arresting member surrounding said extractor inside said casing and adapted to receive the extracted liquid, said member having a discharge orifice and being angularly adjustable about a vertical axis, a catch basin carried by said casing adapted to receive the effluent from said orifice for one position of the discharge orifice of said member, said orifice discharging into said casing for other positions of said member, and a conduit from said catch basin to the exterior of said casing.

8. In a combined clothes washing and extracting machine, the combination with a casing adapted to hold washing liquid and a centrifugal extractor located therein and spaced above the bottom thereof, a liquid agitating element located in the bottom portion of said casing of an annular gutter surrounding said extractor inside said casing and having a discharge orifice, a comparatively small catch-basin in said casing underneath said orifice adapted at times to overflow into said casing, and a valve-controlled conduit from said catch-basin to the exterior of said casing.

9. In a combined clothes washing and extracting machine, a liquid holding casing, an upright bearing therein, a shield supported upon said bearing, shaft means extending through said bearing, an extractor container carried by said shaft means inside said shield, an agitator below said shield swiveled around said bearing, means working through a side opening in said bearing for connecting said agitator to said shaft means, and power means associated with said shaft means for selectively rotating said extractor container and for oscillating said agitator.

10. In a combined clothes washing and extracting machine, a liquid containing casing, an extractor container mounted in the upper part of said casing for rotation about a vertical axis and having a side wall which is defined by a surface of revolution, said container being substantially smaller than said casing and located to one side of the center thereof to provide a working opening whereby access may be had to the lower part of said casing, an oscillatable dasher mounted in the bottom part of said casing beneath and coaxial with said container, means for oscillating said dasher, and means for rotating said container, said oscillating means and said rotating means comprising coaxial shafts one within the other for selectively driving said extractor container and said dasher.

11. In a combined clothes washing and extracting machine, a liquid containing casing, an extractor container mounted in the upper part of said casing for rotation about a vertical axis and having a side wall which is defined by a surface of revolution, said container being substantially smaller than said casing and located to one side of the center thereof to provide a working opening whereby access may be had to the lower part of said casing, a shield surrounding said container in closely spaced relation therewith, an oscillatable dasher mounted in the bottom part of said casing beneath and coaxial with said container, means for oscillating said dasher, and means for rotating said container.

JAMES B. KIRBY.